United States Patent
Ponton et al.

(10) Patent No.: US 9,669,473 B2
(45) Date of Patent: Jun. 6, 2017

(54) PORTABLE DRILL ASSIST TOOL

(71) Applicant: The Boeing Company, Chicago, IL (US)

(72) Inventors: Andrew J. Ponton, Summerville, SC (US); Aaron J. Pedersen, Summerville, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/736,187

(22) Filed: Jun. 10, 2015

(65) Prior Publication Data

US 2016/0361768 A1    Dec. 15, 2016

(51) Int. Cl.
| | |
|---|---|
| B23B 47/26 | (2006.01) |
| B23B 49/02 | (2006.01) |
| B23B 47/28 | (2006.01) |

(52) U.S. Cl.
CPC ............. *B23B 49/02* (2013.01); *B23B 47/28* (2013.01); *B23B 2215/04* (2013.01); *Y10T 408/568* (2015.01)

(58) Field of Classification Search
CPC ..... B23B 49/02; B23B 2215/04; B23B 35/00; B23B 47/28; B23B 47/281; B23B 47/282; B23B 47/284; B23B 47/285; B23B 47/287; Y10T 408/567; Y10T 408/568; Y10T 408/553; B25H 1/0078; B25H 1/0085; A47C 7/008; A47C 7/506
USPC ................... 248/523, 525; 47/40.5
See application file for complete search history.

(56) References Cited

U.S. PATENT DOCUMENTS

| | | | | |
|---|---|---|---|---|
| 575,469 | A * | 1/1897 | Fancher | B23B 47/28 279/133 |
| 1,857,930 | A * | 5/1932 | Altorfer | D06F 39/125 16/19 |
| 2,501,036 | A * | 3/1950 | Fay | B23B 47/28 33/501 |
| 2,729,891 | A * | 1/1956 | Winter | B25H 7/005 33/21.3 |
| 2,844,977 | A * | 7/1958 | Morse | B23B 49/026 324/259 |
| 2,898,785 | A * | 8/1959 | Quick | B23B 47/28 408/115 R |
| 2,936,657 | A * | 5/1960 | Berlin | B23B 49/02 408/115 R |

(Continued)

*Primary Examiner* — Sunil K Singh
*Assistant Examiner* — Paul M Janeski
(74) *Attorney, Agent, or Firm* — Haynes and Boone, LLP

(57) ABSTRACT

An apparatus and method according to one or more embodiments are provided for a tool that guides a drill in drilling a hole at an angle substantially perpendicular to a non-planar work surface. The tool may be implemented, for example, as a portable drill assist tool that rests unsecured on a non-planar work surface substantially perpendicular to a target hole formed within the non-planar work surface. In one example, an apparatus includes a main body having a through hole formed therein. The through hole is configured to receive a drill bushing and an alignment pin. The apparatus further includes at least three legs configured to independently translate relative to the main body to contact the non-planar surface and maintain the through hole substantially perpendicular to the non-planar work surface when the alignment pin is passed through the drill bushing and into the target hole.

18 Claims, 11 Drawing Sheets

(56) References Cited

U.S. PATENT DOCUMENTS

| | | | | |
|---|---|---|---|---|
| 2,991,668 A * | 7/1961 | Keller | ..................... | B23B 47/28 |
| | | | | 408/76 |
| 2,996,936 A * | 8/1961 | Blaise | ..................... | B23B 47/28 |
| | | | | 408/115 R |
| 3,097,891 A * | 7/1963 | Brideau | ................. | B23B 49/02 |
| | | | | 173/31 |
| 3,204,493 A * | 9/1965 | Severdia | ................ | B23B 47/28 |
| | | | | 33/645 |
| 3,492,739 A * | 2/1970 | Boyle, Jr. | ............... | B23B 49/02 |
| | | | | 248/188.2 |
| 4,836,720 A | 6/1989 | Hadden | | |
| 5,207,681 A | 5/1993 | Ghadjar et al. | | |
| 6,206,885 B1 | 3/2001 | Ghahremani et al. | | |
| 6,813,843 B1 | 11/2004 | Faubion | | |
| 7,614,159 B2 | 11/2009 | Kilwin et al. | | |
| 2010/0282926 A1 * | 11/2010 | Shen | ..................... | F16M 11/32 |
| | | | | 248/179.1 |

* cited by examiner

PORTABLE DRILL ASSIST TOOL

TECHNICAL FIELD

The invention relates generally to manual drill assist tools and, more particularly, to a tool that guides a drill in drilling a hole at an angle substantially perpendicular to a non-planar work surface.

BACKGROUND

In the field of airframe assembly, there is an ongoing effort to provide for a reliable, efficient and economical way to manually drill a hole perpendicular to the surface of a complex airframe assembly.

Manual drilling of complex exterior airframe assemblies and parts account for approximately 40 percent of required drilling at the airframe assembly level. Airframe assemblies and parts are generally received with pre-drilled target holes (e.g., determinant assembly holes). A machinist may be required to enlarge the target hole to accommodate, for example, the addition of components or to attach adjoining assemblies. A machinist may be required to drill a hole substantially perpendicular to the surface of the assembly at the location of the target hole. Assemblies may include multiple layers of structural materials in varying hardness and quality and such assemblies may range from approximately ¾ inch to 1½ inches in overall thickness. Some assemblies may be contoured and have irregular shapes and/or curvatures in multiple directions. For example, the first component in a multi-layered assembly may be a composite barrel of ever changing conic shape. Additional layers of an assembly may be expensive materials such as forged titanium or forged aluminum.

Conventional manual hand drilling systems employ a number of techniques to drill a hole perpendicular to a contoured composite surface. However, these conventional systems typically lack the necessary features required to reliably guide a drill bit perpendicular to a surface over the multitude of complex airframe assembly contoured surfaces. An eggcup tool may be used as a hand-held drill guide to guide a drill bit substantially perpendicular to a non-planar work surface. Unfortunately, eggcup tools rely on the work surface to be substantially flat to achieve a drilled hole perpendicular to the work surface.

Custom drill blocks may be used as a drill guide for manual drilling applications where the surface to be drilled includes multiple contours, curvatures and/or obstructions. However, a custom drill block may be extremely complex and costly to both design and manufacture. Further, multiple custom drill blocks may be required as their use is limited to specific surface contours and assembly locations.

As set forth above, these approaches fail to provide for a reliable, adaptable and economical manual hand drill system. Thus, there is a need to provide a reliable and adaptable apparatus and efficient and repeatable method to accurately drill a hole substantially perpendicular to a surface of a complex airframe assembly or component.

SUMMARY

Systems and methods are disclosed herein in accordance with one or more embodiments that provide an improved approach to aligning a drill bit perpendicular to a non-planar work surface and drilling a hole. In some embodiments, a portable drill assist tool is implemented with a main body and a plurality of legs. In one example, a main body is implemented with a through hole configured to receive a drill bushing. An alignment pin is passed through the drill bushing to align the through hole substantially perpendicular to a target hole formed within a non-planar work surface. The main body provides for hollow cavities adapted to receive a plurality of leg guides, a leg guide forming a part of the leg. The legs maintain a stable support for the main body and alignment to the non-planar work surface where the non-planar work surface may include various contours near the target hole or may be obstructed in the area surrounding the target hole.

In one embodiment, an apparatus includes a main body having a through hole formed therein, the through hole configured to receive a drill bushing and an alignment pin passed through the drill bushing to align the through hole substantially perpendicular to a target hole formed within a non-planar work surface; and at least three legs configured to independently translate relative to the main body to contact the non-planar work surface and maintain the through hole in the substantially perpendicular alignment.

In another embodiment, a method includes providing an apparatus comprising a main body having a through hole formed therein and at least three legs configured to independently translate relative to the main body; inserting a drill bushing into the through hole; passing an alignment pin through the drill bushing into a target hole in a non-planar work surface to align the through hole perpendicular to the non-planar work surface; and adjusting the legs to contact the non-planar work surface to maintain the through hole in the perpendicular alignment to the non-planar work surface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Figure 1:
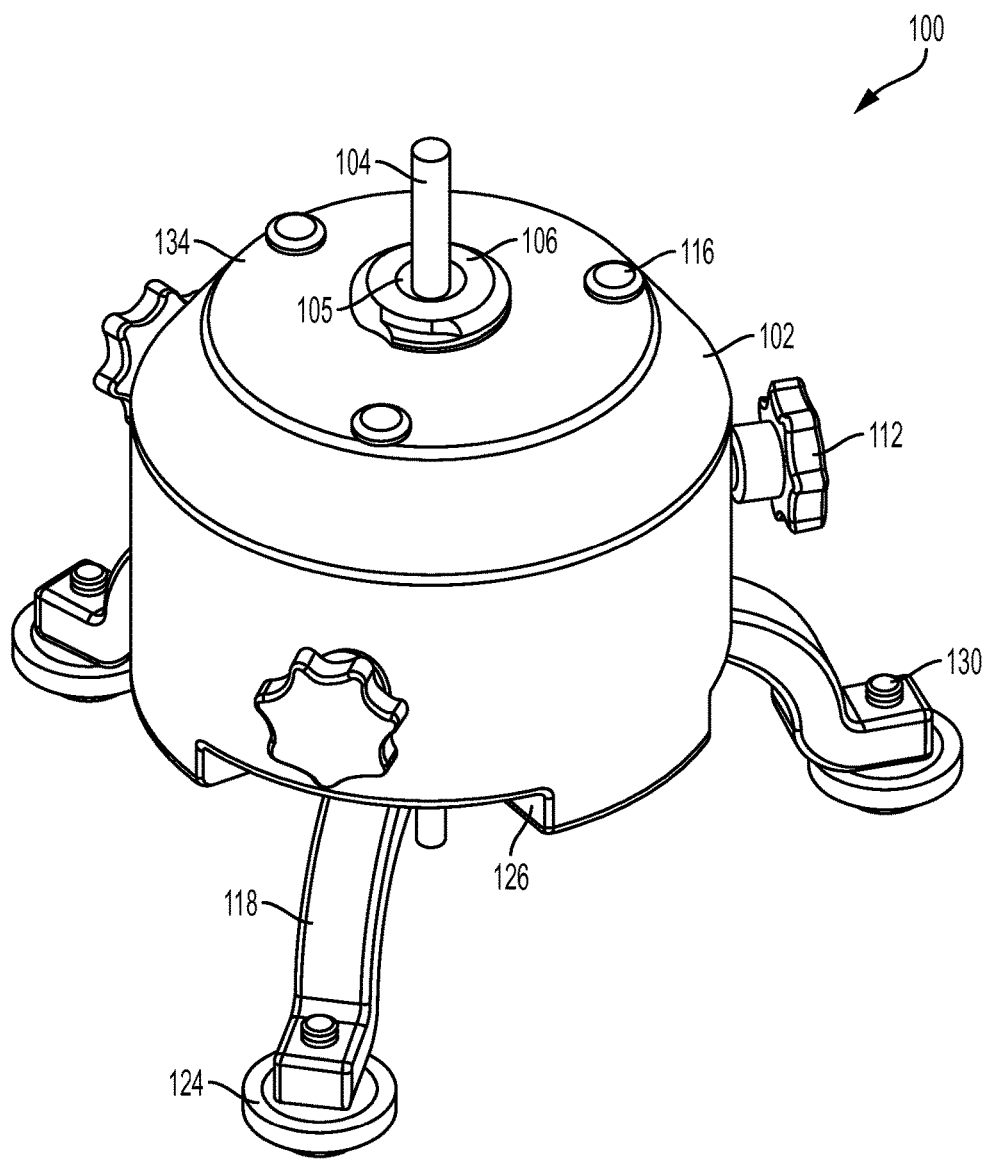
FIG. 1 illustrates an isometric view of a portable drill assist tool in accordance with an embodiment of the disclosure.
Figure 2:
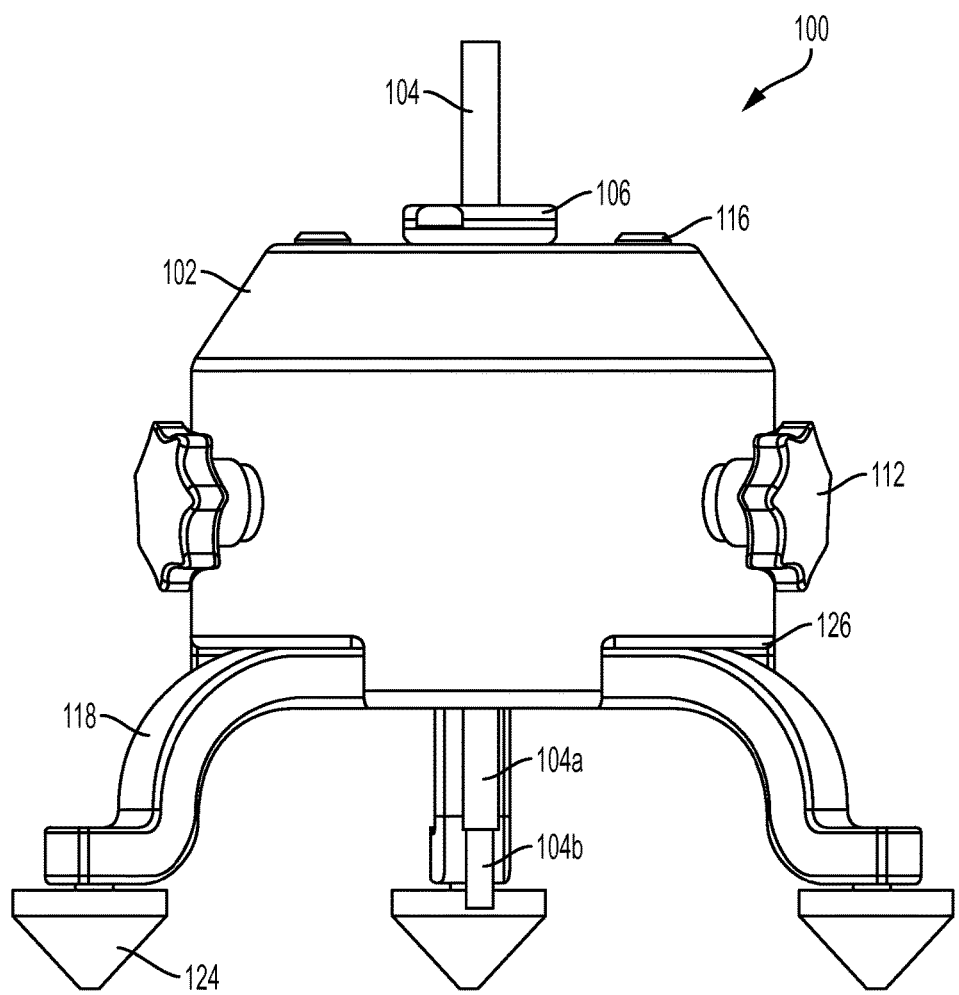
FIGS. 2 and 3 illustrate side views of a portable drill assist tool in accordance with embodiments of the disclosure.
Figure 3:
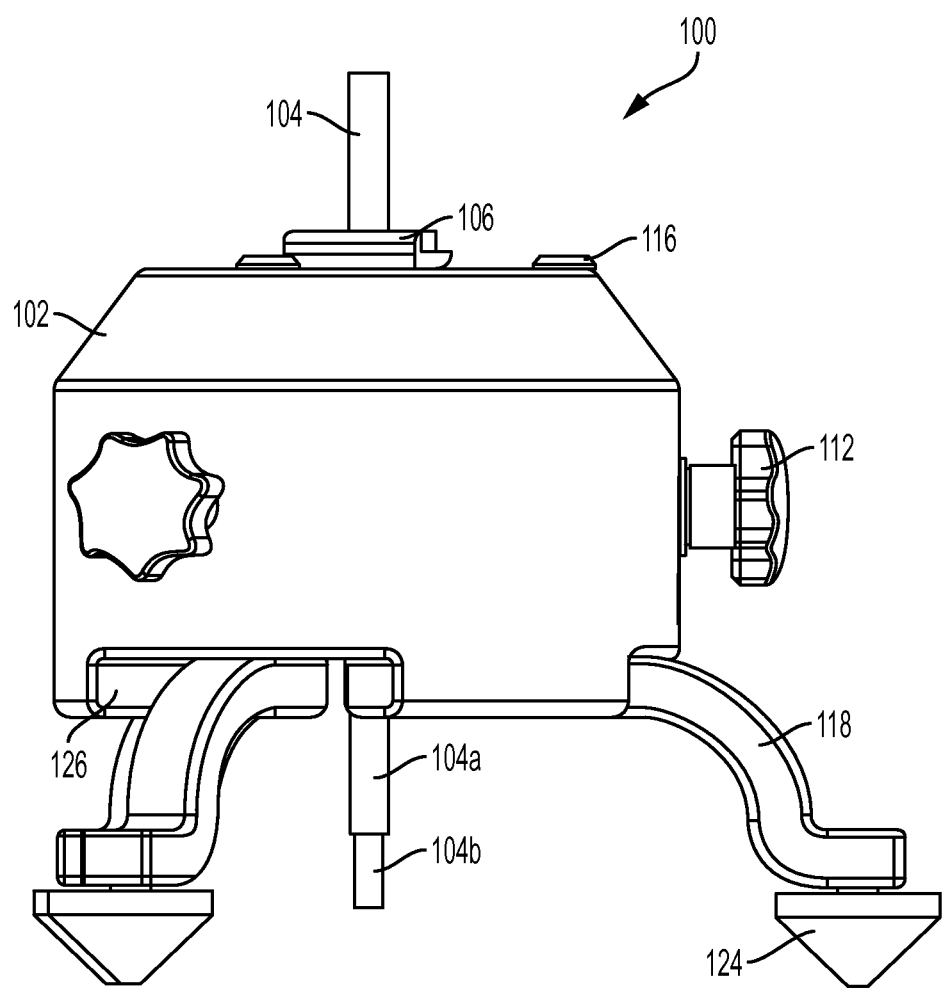
Figure 4:
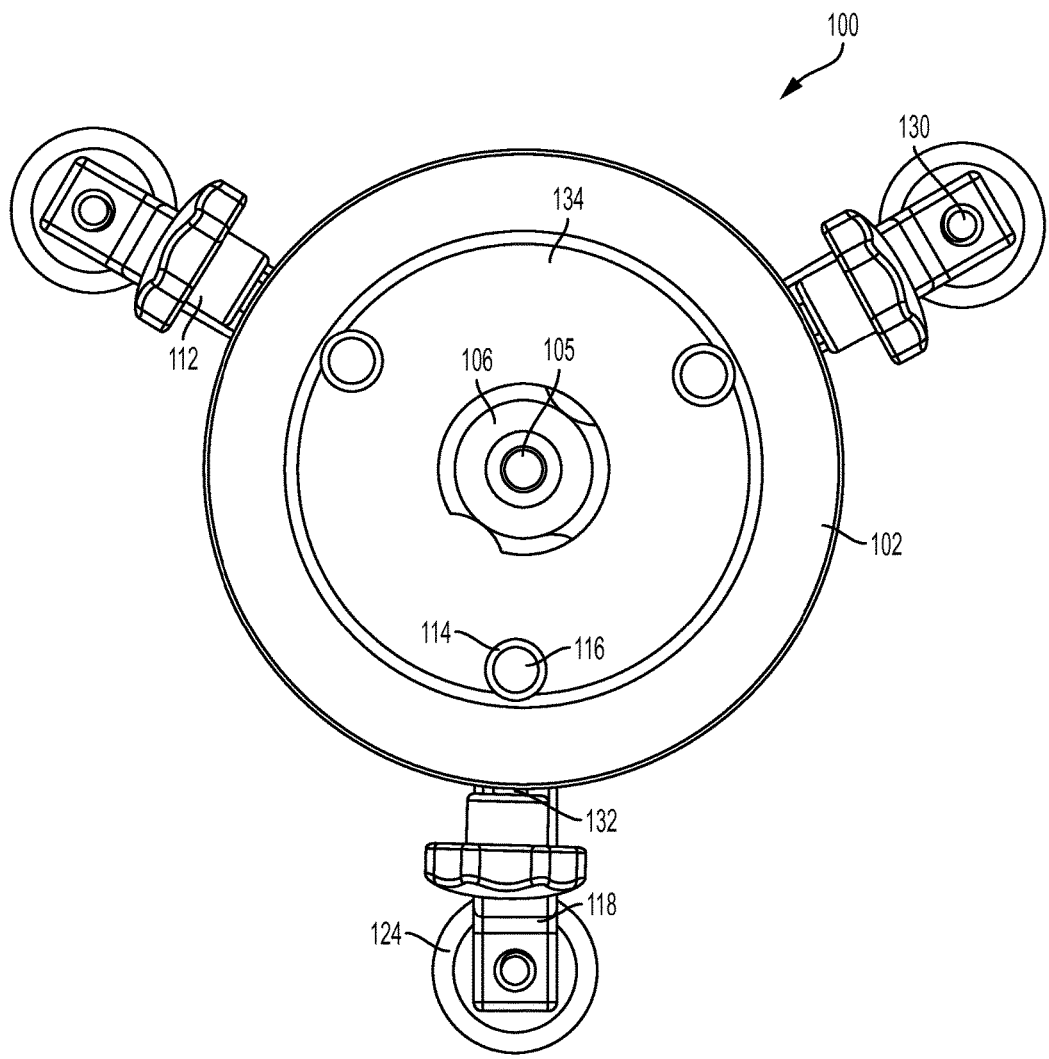
FIG. 4 illustrates a top view of a portable drill assist tool in accordance with an embodiment of the disclosure.
Figure 5:
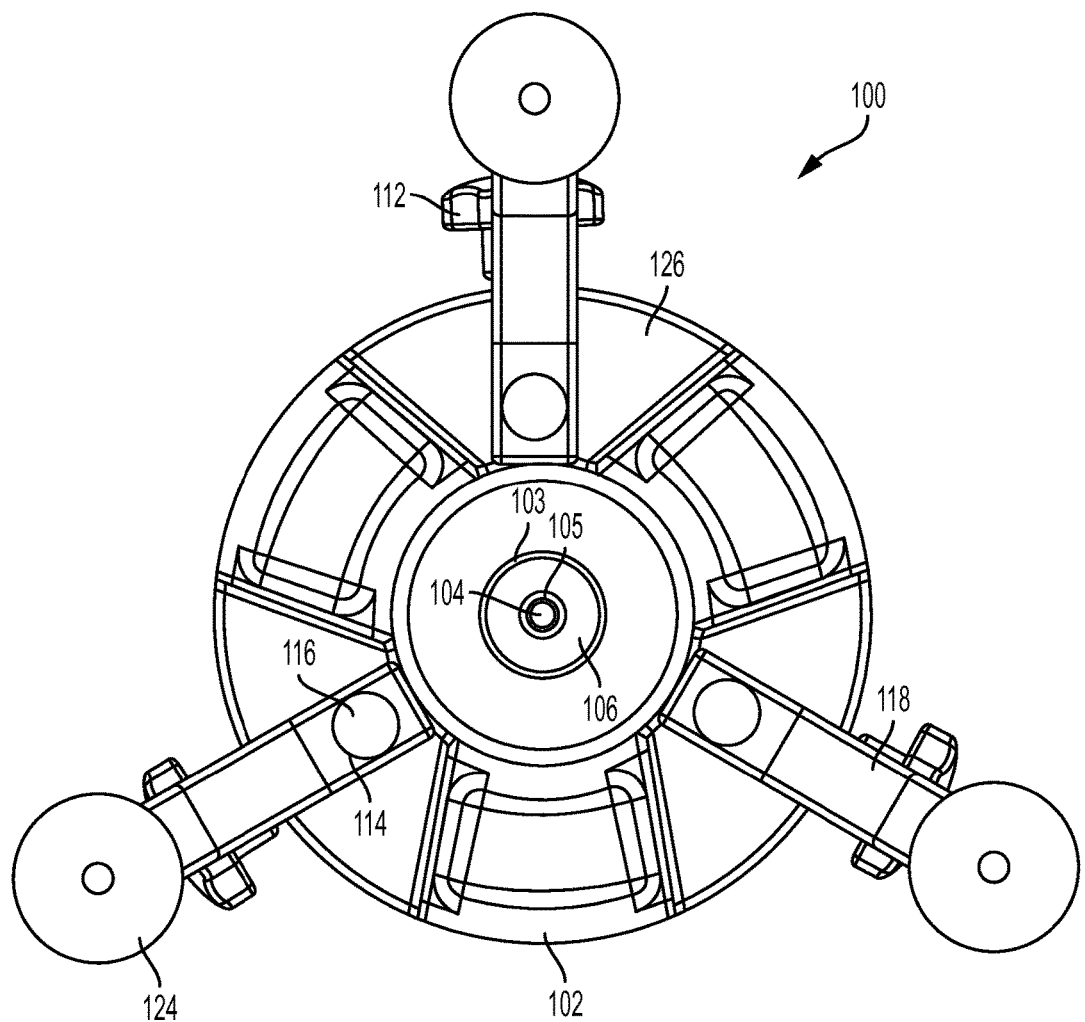
FIG. 5 illustrates a bottom view of a portable drill assist tool in accordance with an embodiment of the disclosure.

Embodiments of the invention and their advantages are best understood by referring to the detailed description that

DETAILED DESCRIPTION

In accordance with various embodiments, a portable drill assist tool is described herein that provides a reliable and adaptable apparatus and efficient and repeatable method to accurately drill a hole substantially perpendicular to a surface of a complex assembly or component.

FIGS. 1 through 8 illustrate various views of a portable drill assist tool 100 in accordance with embodiments of the disclosure. These views aid in illustrating embodiments of the disclosure and the detailed discussion herein may refer to these views and elements contained within these views.

The portable drill assist tool 100 includes a main body 102, the main body 102 having a through hole 103 formed therein. The through hole 103 may be configured to receive a drill bushing 106 and an alignment pin 104 passed through the drill bushing 106 to align the through hole 103 substantially perpendicular to a target hole in a non-planar work surface. Further, the portable drill assist tool 100 includes at least three legs 117. Each leg 117 may be configured to independently translate relative to the main body 102 to contact a non-planar work surface and maintain the through hole 103 in the substantially perpendicular alignment.

In some embodiments, the portable drill assist tool 100 may be implemented with a cylindrical aluminum main body 102. However, the main body 102 may be implemented with other materials, such as for example a thermoplastic. The main body 102 having therein holes and cutouts necessary to implement the invention.

The through hole 103 may be formed in a center of the main body 102 and extends from a center of a top surface 134 of the main body 102 to a center of a bottom surface 136 of the main body 102. In some embodiments, the through hole 103 may be a round hole having a substantially cylindrical shape (e.g., see FIG. 8). However, the through hole 103 may be formed in other shapes (e.g., a square hole).

The portable drill assist tool 100 further includes a drill bushing 106 and an alignment pin 104. The through hole 103 may be configured with a diameter to receive the drill bushing 106. The drill bushing 106 may be configured with an outer diameter substantially conforming to the through hole 103 and may be provided as a slip-fixed renewable bushing to removably secure the drill bushing 106 within the through hole 103. The drill bushing 106 may be implemented with a guide hole 105 (e.g., inner diameter of the drill bushing) sized to receive the alignment pin 104. Further, a plurality of drill bushings 106 may be implemented to receive a plurality of drill bits. In some embodiments, the drill bushing 106 may be implemented wherein the guide hole 105 is sized to receive both an alignment pin 104 and a drill bit.

The alignment pin 104 is used to align the main body 102 to a target hole on a non-planar work surface. In this regard, the elongated alignment pin 104 may be formed with a first diameter 104a at a first end sized to pass through the guide hole 105 of the drill bushing 106, the first diameter 104a extending to near a second end of the alignment pin 104. The elongated alignment pin 104 may be formed with a second diameter 104b at the second end conforming to the target hole to pass into the target hole. The target hole may be pre-drilled at an angle of substantially 90 degrees to a plane defined by a tangent to the non-planar work surface (e.g., substantially perpendicular to the target hole in the non-planar work surface). Thus, when the alignment pin 104 is passed through the guide hole 105 at a first end and passed into the target hole at a second end, the main body 102 may be aligned substantially perpendicular to the target hole in the non-planar work surface.

Each of the at least three legs 117 may be implemented to translate relative to the main body 102 to contact the non-planar work surface, enabling the main body 102 to be supported against a plurality of non-planar work surface contours 906, 908, and 910 and obstructions 904 (e.g., see FIG. 9), and maintain the through hole 103 in the substantially perpendicular alignment. In this regard, each leg 117 may be configured to slide within a corresponding cavity 114 in the main body 102 to translate toward the non-planar work surface along a corresponding axis. Each leg 117 may be configured to selectively pivot relative to the main body 102 to selectively position an end of the leg 117 relative to the non-planar work surface about the corresponding axis illustrated in FIG. 7, 702. In this regard, the leg 117 may be pivotally rotated about the corresponding axis fixed at the location of the cavity 114.

In some embodiments, each of at least three cavities 114 may be a smooth hollow hole formed in the main body 102 and configured to receive the leg 117. The at least three cavities 114 may be spaced equidistantly from the center of the main body 102 around the perimeter of the top surface 134 of the main body 102. The cavity 114 may extend from the top surface 134 of the main body to the bottom surface 136 of the main body.

The main body 102 may be implemented with a leg rotational travel cutout 126 formed in the bottom surface 136 of the main body 102. The leg rotational travel cutout 126 allows the leg 117 to rotate freely in a horizontal direction about an angle of 90 degrees fixed at the cavity 114 when the leg 117 is fully retracted against the main body 102. Allowing a 90 degree rotational travel of the leg 117 when in the fully retracted position minimizes interference between adjacent legs 117.

The leg 117 includes a leg guide 116, a leg extension 118 and a pad 124. The leg guide 116 may be formed as a cylindrical rod to slide within cavity 114 along the corresponding axis and selectively pivot relative to the main body 102 about the corresponding axis. In some embodiments, the leg guide 116 may be formed from aluminum, although other materials may be possible in other embodiments. The leg guide 116 may be elongated to extend through the cavity 114. Further, the leg guide 116 may be physically secured at a first end of a leg extension 118. The leg extension 118 may be an elbowed bar arched at a first end and physically secured to the leg guide 116 at the first end through hole 122. The leg extension 118 may be arched at a second end and includes a threaded hole 120 at the second end to receive a pad 124. The pad 124 includes a threaded fastener 130 configured to thread into the leg extension 118 to physically secure the pad 124 to the leg extension 118. In some embodiments, leg extension 118 and pad 124 may be formed from aluminum, although other materials may be possible in other embodiments.

An insert hole 108 may be formed into the main body 102 at an outer surface of the main body 102, the insert hole 108 may be configured with a diameter to receive a threaded insert 110. At least three insert holes 108 may be spaced equidistantly around a perimeter surface of the main body 102 and formed inwardly until the insert hole 108 breaks through the cavity 114. The threaded insert 110 may be physically secured within the insert hole 108.

The insert hole 108 may be configured to allow a lock mechanism 107 (e.g., a lock handle 112 including a threaded fastener 132) to pass through the corresponding insert hole 108 distributed about the perimeter of the main body and exert a lateral force to fix the legs 117 relative to the main body 102 to maintain the through hole 103 in the substantially perpendicular alignment. In some embodiments, at least three lock mechanisms (e.g., lock handle 112 including a threaded fastener 132) may be included to fix each of the at least three legs 117.

Figure 6:
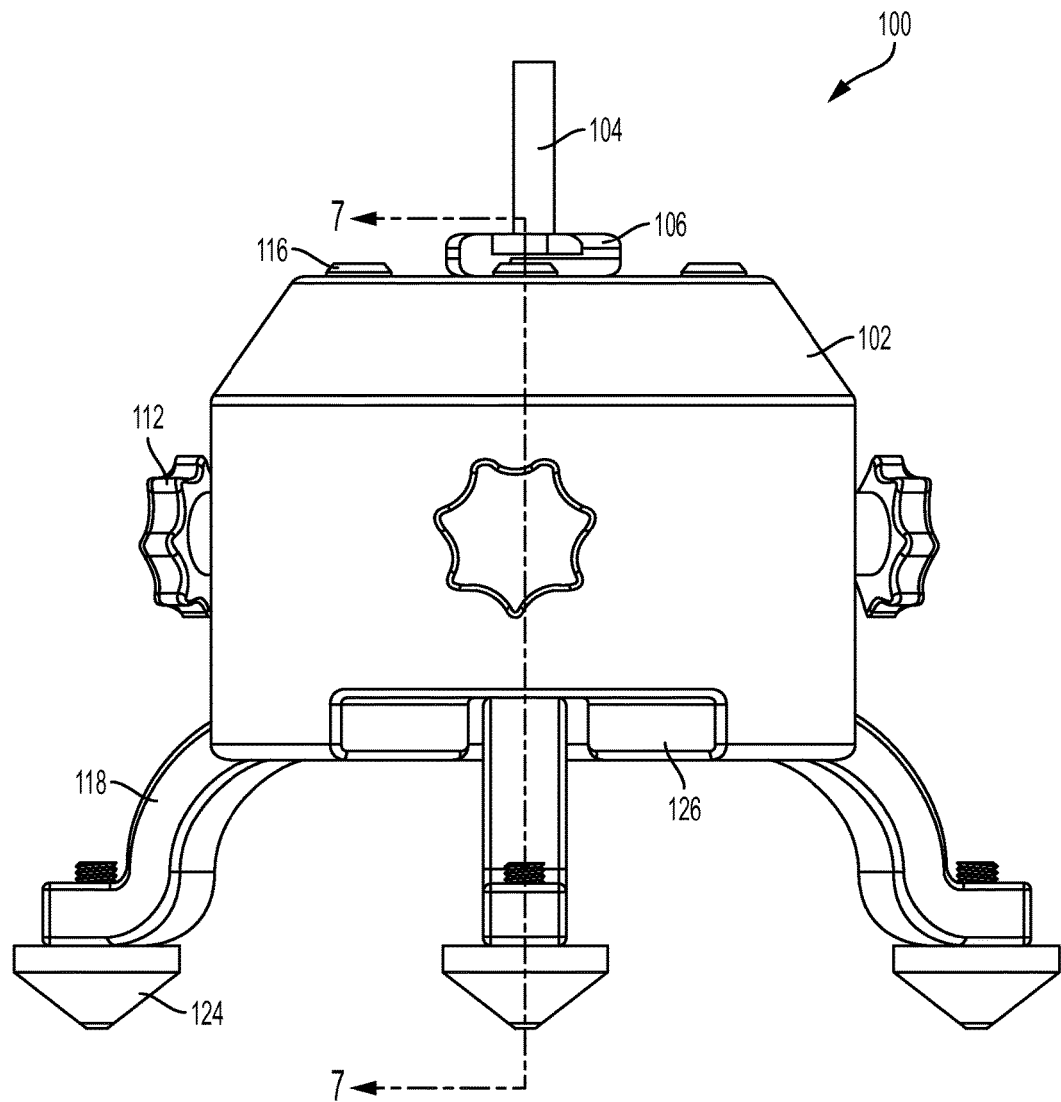
FIG. 6 illustrates another side view of a portable drill assist tool in accordance with an embodiment of the disclosure.
Figure 7:
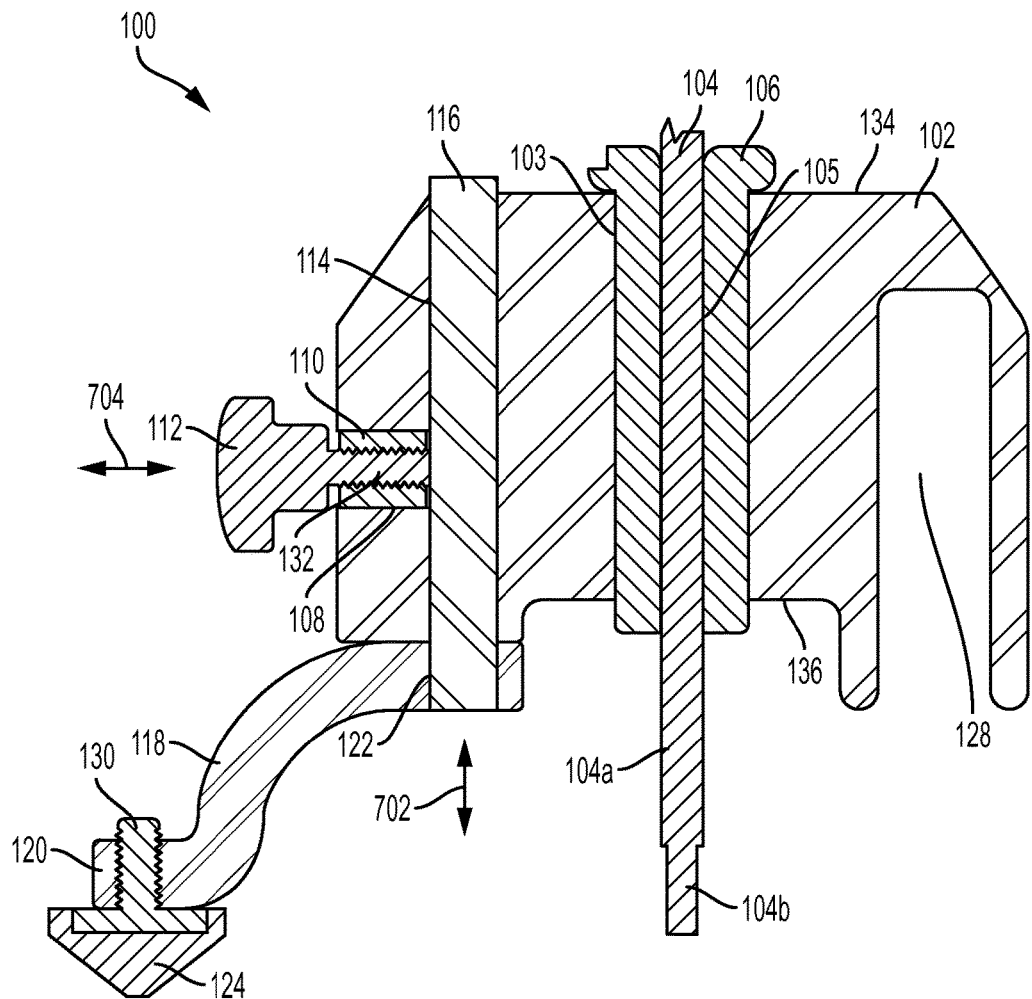
FIG. 7 illustrates a cross section view taken at line 7-7 of the portable drill assist tool of FIG. 6 in accordance with an embodiment of the disclosure.
Figure 8:
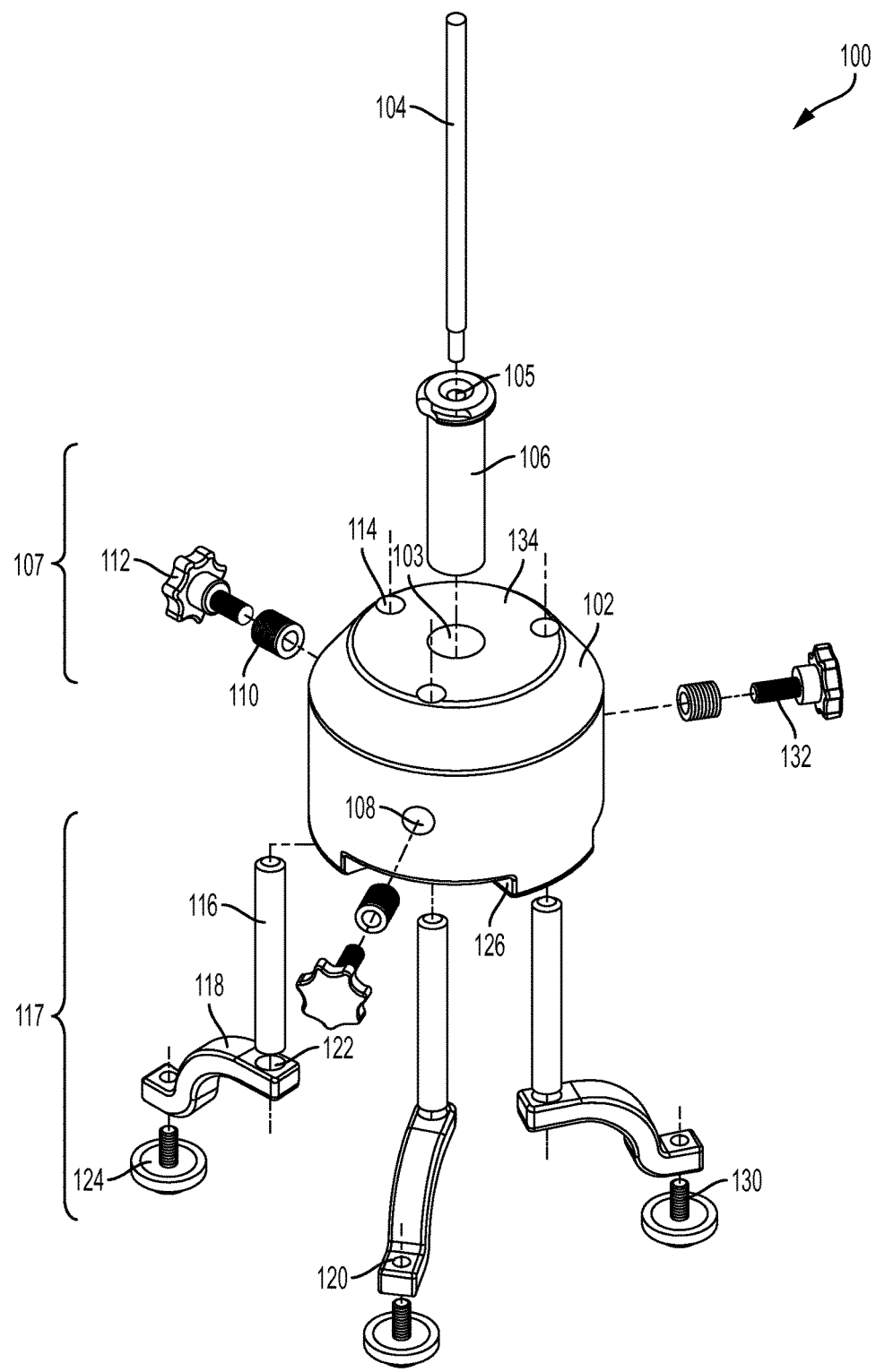
FIG. 8 illustrates an exploded view of a portable drill assist tool in accordance with embodiments of the disclosure.

FIG. 7 illustrates a cross section view taken at line 7-7 of the portable drill assist tool 100 of FIG. 6 in accordance with an embodiment of the disclosure.

FIG. 7 illustrates the main body 102 having therein holes and cutouts necessary to implement the invention. A through hole 103 may be formed substantially perpendicular to the main body 102 with a diameter to receive a drill bushing 106. The through hole extends from the top surface 134 through the bottom surface 136. The drill bushing 106 may be removeably received into the through hole 103. The drill bushing 106 receives an alignment pin 104 to guide the alignment pin 104 to a target hole on a non-planar work surface.

The alignment pin 104 includes a diameter 104*a* conforming to the diameter of the guide hole 105 at a first end. The alignment pin 104 includes a diameter 104*b* conforming to the diameter of the target hole. Thus, when the alignment pin 104 is passed through the guide hole 105 from a first diameter 104*a* and the target hole from a second diameter 104*b*, the main body 102 may be aligned substantially perpendicular to the target hole in the non-planar work surface.

The leg 117 includes a leg guide 116, a leg extension 118 and a pad 124. The leg extension may be arched at a first and second end to receive a leg guide 116 at a first end through hole 122 and a pad 124 at a second end threaded hole 120. The leg guide 116 may be physically secured to the leg extension 118 within through hole 122. The pad 124 includes a threaded fastener 130 configured to be threaded into the leg extension 118 threaded hole 120 to physically secure the pad 124 to the leg extension 118.

The leg guide 116 may slide within the hollow cavity 114 to position leg 117 on the non-planar work surface. In this regard, each leg 117 may be configured to slide within a corresponding cavity 114 in the main body 112 to translate toward the non-planar work surface along a corresponding axis. Each leg 117 may be further configured to selectively pivot relative to the main body 112 to selectively position an end of the leg 117 relative to the non-planar work surface about the corresponding axis (e.g., about the leg extension 118 at insert hole 108) as illustrated in FIG. 7 702.

In some embodiments, translation of leg 117 may be limited in part to the length of the leg guide 116. The leg 117 movement in the direction illustrated by 702 may be further limited by the height of the main body 102 and the location of the insert hole 108. A portable drill assist tool 100 may be adapted through slight geometric modification of leg 117 (e.g., guide 116, leg extension 118 and pad 124), main body 102 and insert hole 108 of the portable drill assist tool 100. In this regard, the portable drill assist tool 100 may be adapted to applications where, for example, obstructions may be tall. Further, a larger main body 102 and a larger through hole 103 to receive a larger drill bushing 106 may accommodate drilling larger holes. In this regard, the portable drill assist tool 100 may need to be geometrically modified to support additional drilling capability.

At least three lock mechanisms 107 (e.g., lock handle 112 including threaded fastener 132) may be configured to pass through corresponding insert holes 108 distributed about a perimeter of the main body 102 and exert a lateral force to fix the legs 117 relative to the main body 102 to maintain the through hole 103 in the substantially perpendicular alignment. In this regard, at least three insert holes 108 may be formed into the main body 102, distributed about a perimeter surface of the main body 102 and extending inwardly through the cavity 114. A threaded insert 110 may be physically secured in each of the insert holes 108 and contained within the insert hole 108.

The legs 117 may be adjusted to a position wherein the pads 124 rest unsecured on the non-planar work surface and the portable drill assist tool 100 may be aligned substantially perpendicular to the target hole on the non-planar work surface. The at least three lock mechanisms 107 may be turned into the threaded inserts 110 contained within the insert hole 108 to fix the legs 117 relative to the main body 102 to maintain the through hole 103 in the substantially perpendicular alignment. Each leg 117 may be independently fixed relative to the main body 102 and each leg 117 may be independently released relative to the main body 102 by turning the lock mechanism out of the threaded insert 110 as illustrated in FIG. 7 704.

In some embodiments, a leg 117 may be configured with a ratchet means wherein the cavity 114 and leg guide 116 include cogging. The cavity 114 and leg guide 116 cogs interleave to iteratively lock the motion of the leg 117 as it slides within the cavity 114. Additional legs 117 may be used in other embodiments and it is understood additional cavities 114 and insert holes 108 may be formed to accommodate additional legs 117. Further, additional threaded inserts 110, lock handles 112 and threaded fasteners 132 may be provided.

At least one blind pocket 128 may be formed within the main body 102 that may be configured to reduce a weight of the portable drill assist tool 100.

Figure 9:
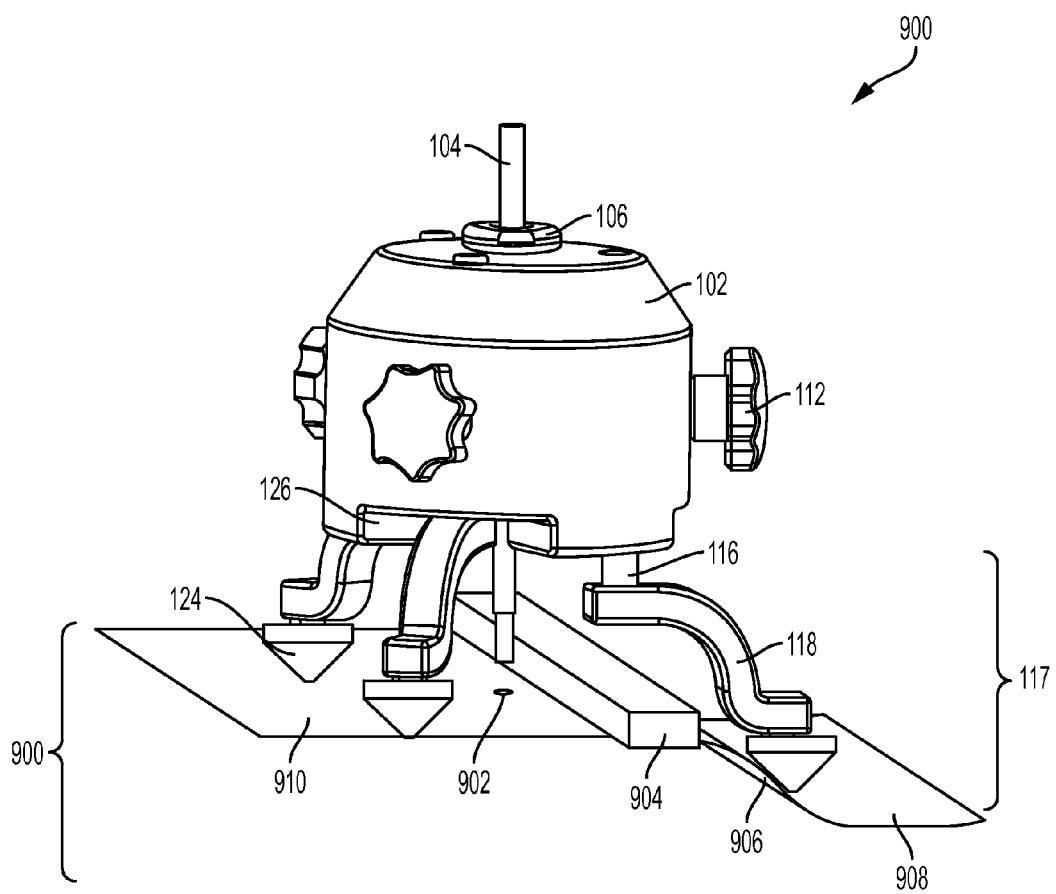
FIGS. 9 and 10 illustrate a portable drill assist tool operable on a non-planar work surface in accordance with embodiments of the disclosure.
Figure 10:
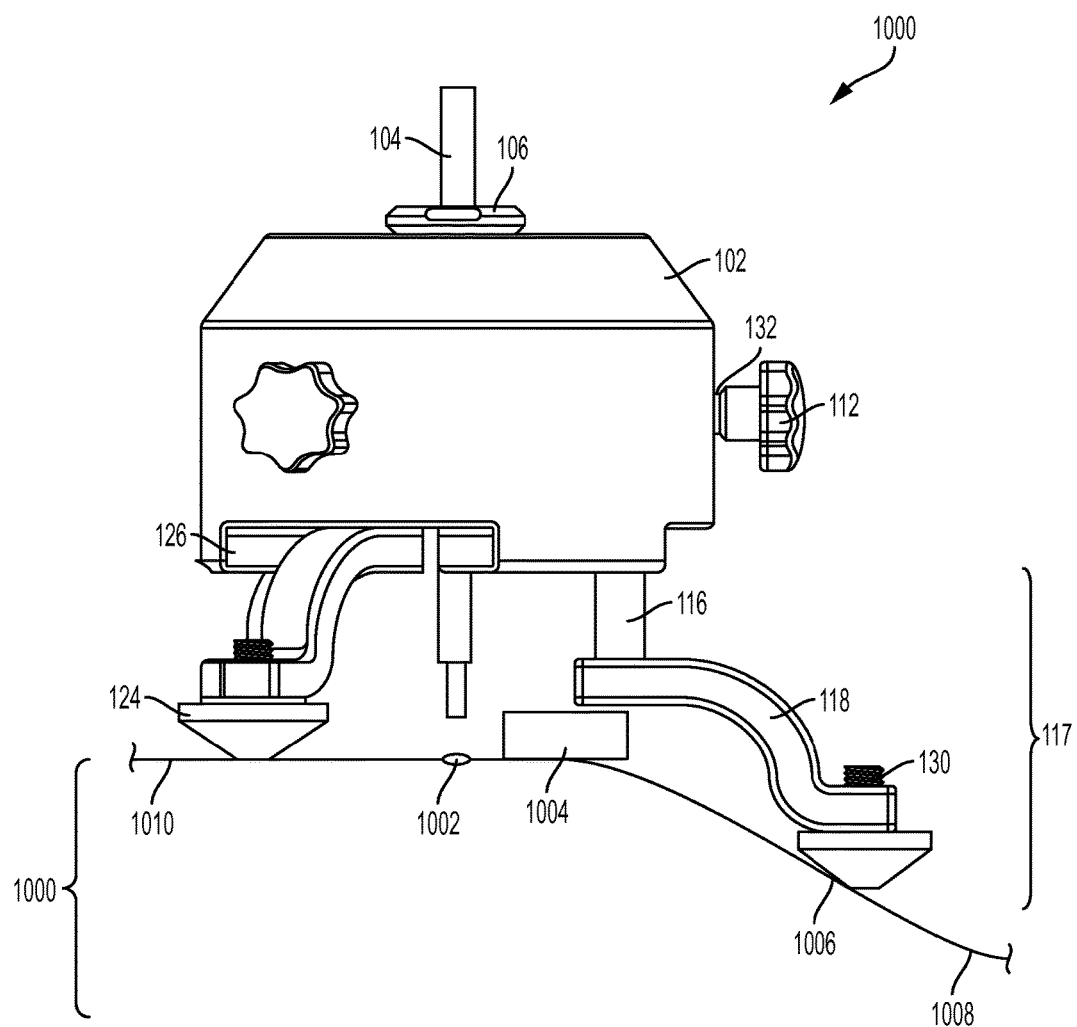

FIGS. 9 and 10 illustrate a portable drill assist tool operable on various contoured surfaces in accordance with an embodiment of the disclosure. FIGS. 9 and 10 provide various irregular surfaces and contours illustrating a complex non-planar work surface. For example, FIGS. 9 and 10 illustrate flat surfaces (e.g., FIG. 9 910 and FIG. 10 1010), sloped contours (e.g., FIG. 9 906 and FIG. 10 1006) and smooth contours (e.g., FIG. 9 908 and FIG. 10 1008). Each figure further illustrates an obstruction (e.g., FIG. 9 904 and FIG. 10 1004) typical of a complex non-planar work surface 900. The detailed discussion herein may refer to elements contained in FIG. 9. It is understood that FIG. 10 contains elements generally corresponding to elements of FIG. 9 and discussion of the elements contained in FIG. 9 is generally applicable to FIG. 10.

The figures provide a target hole (e.g., in FIG. 9 target hole 902 and in FIG. 10 target hole 1002) wherein the portable drill assist tool 100 is placed over the target hole 902. The alignment pin 104 may be placed within the target hole 902 by passing the alignment pin 104 through the drill bushing 106 using the guide hole 105 as a guide. In this regard, the portable drill assist tool 100 may be aligned substantially perpendicular to the target hole 902 in the non-planar work surface 900. The portable drill assist tool 100 may be held in place by an operator to maintain the through hole 103 in the substantially perpendicular alignment while the lock mechanisms 107 may be turned outward to loosen the at least three legs 117 (e.g., FIG. 7 704). The legs 117 may be translated and/or rotated wherein the at least three legs 117 pads 124 may be configured to rest on the non-planar work surface 900. Adjustments may be made to the legs 117 to allow the pads 124 to rest on the plurality of contours to maintain the through hole 103 in the perpendicular alignment to the non-planar work surface 900. For example, one leg 117 pad 124 may rest on a flat surface 910. A second leg 117 pad 124 may rest on a smooth contour 908. A third leg 117 pad 124 may rest on a sloped contour 906 and over an obstruction 904. Further adjustments may be made to provide clearance of the main body 102 from obstruction 904. After adjustments are completed, the lock mechanisms 107 may be turned inward (e.g., FIG. 7 704) to fix the legs 117 relative to the main body 102 to maintain the through hole 103 in the substantially perpendicular alignment.

Figure 11:
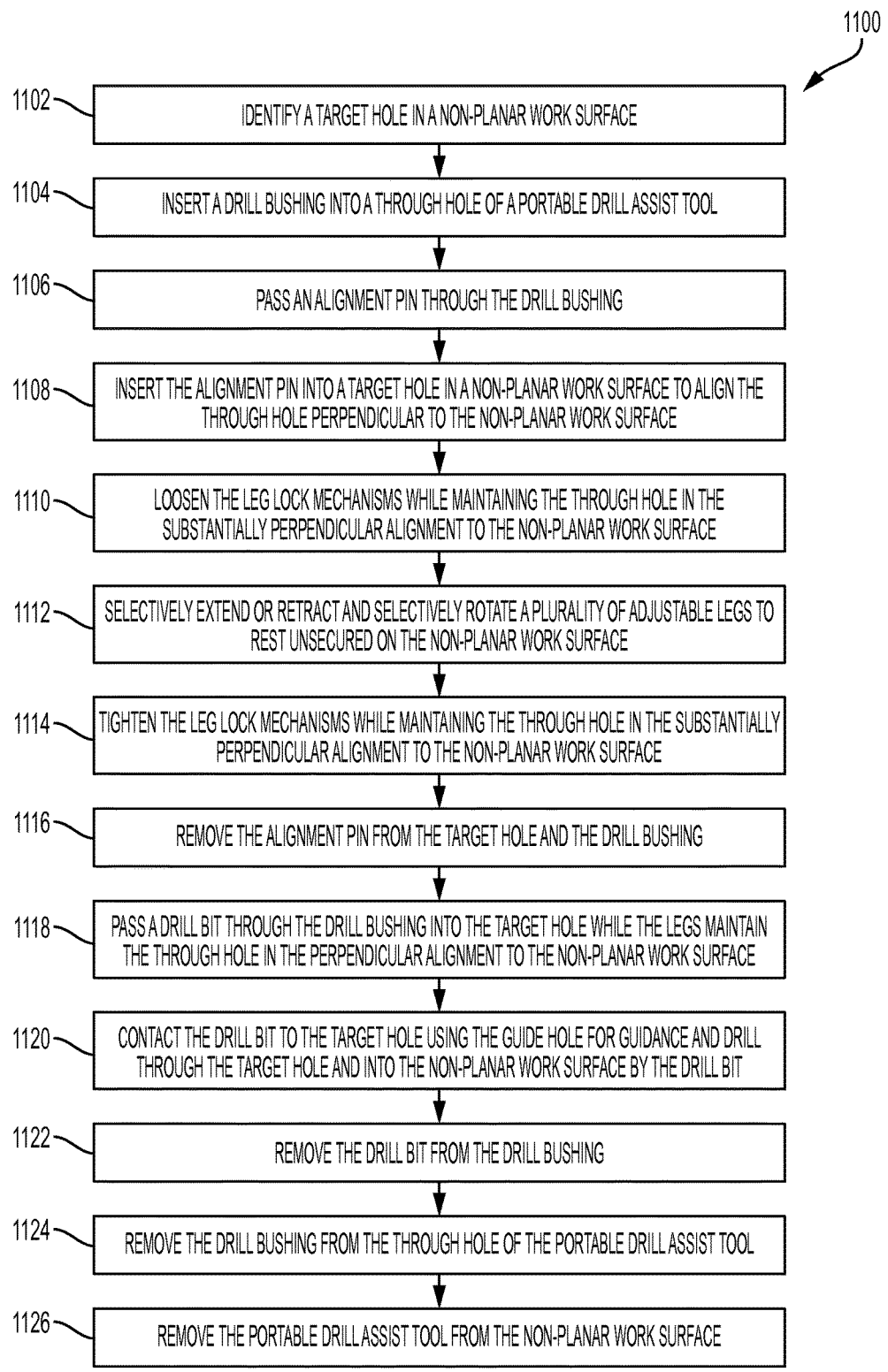
FIG. 11 illustrates a method of using a portable drill assist tool in accordance with an embodiment of the disclosure.

FIG. 11 is a flow chart that illustrates a method 1100 of aligning a drill bit perpendicular to a non-planar work surface and drilling a hole in accordance with an embodiment of the disclosure.

The method 1100 may begin by identifying a target hole 902 in a non-planar work surface 900 (block 1102). In some embodiments, the target hole 902 may be a pre-drilled hole formed in a non-planar work surface 900. The target hole 902 may be a determinant assembly hole wherein the target hole 902 may be formed in a non-planar work surface 900 at an angle substantially perpendicular to a plane defined by a tangent to the non-planar work surface 900 at the target hole 902. The target hole 902 may be formed in a non-planar work surface 900 comprising multiple layers of structural materials in varying hardness and quality.

After identifying the target hole 902, the method 1100 may include inserting a drill bushing 106 into a through hole 103 of a portable drill assist tool 100 (block 1104). The through hole 103 may be formed at the center of the main body 102 and perpendicular to a top surface 134, the through hole 103 extends from a center of the top surface 134 of the main body 102 to a center of a bottom surface 136 of the main body 102. The through hole 103 diameter may be configured to receive a drill bushing 106. The drill bushing 106 may be configured with an outer diameter conforming to the through hole 103. The drill bushing 106 may be secured within the through hole 103 and may be removed after use. The drill bushing 106 includes an inner diameter configured to receive an alignment pin 104 and/or a drill bit to guide the alignment pin 104 or drill bit. In some embodiments, the first diameter of the alignment pin 104 and the drill bit may be the same diameter and a single drill bushing 106 may be used for alignment and drilling. In other embodiments, drill bushings 106 may be required for each of the alignment pin 104 and drill bits.

After inserting the drill bushing 106, the method 1100 may include passing an alignment pin 104 through the drill bushing 106 (block 1106). As described herein, the alignment pin 104 includes a first diameter 104a and the drill bushing 106 inner diameter (e.g., guide hole) may be configured to receive the alignment pin 104 first diameter 104a.

After passing the alignment pin 104 through the drill bushing 106, the method 1100 may include inserting the alignment pin 104 into the target hole 902 in a non-planar work surface 900 to align the through hole 103 perpendicular to the non-planar work surface 900 (block 1108). The target hole 902 may be located and the portable drill assist tool 100 may be positioned above the target hole 902 by the operator. The alignment pin 104 includes a second diameter 104b conforming to the target hole 902 to insert into the target hole 902. The alignment pin 104 may be inserted into the target hole 902 by the operator. In this regard, once the alignment pin 104 is inserted into the target hole 902, the through hole 103 may be substantially perpendicular to the target hole 902 in the non-planar work surface 900.

After inserting the alignment pin 104 into the target hole 902, the method 1100 may include loosening the leg lock mechanisms 107 while maintaining the through hole 103 in the substantially perpendicular alignment to the non-planar work surface 900 (block 1110). The leg lock mechanisms 107 may be loosened such that legs 117 may be free to translate on the non-planar work surface 900. The operator may physically hold the portable drill assist tool 100 to maintain the alignment pin 104 in the target hole 902.

After the leg lock mechanisms 107 are loosened, the method 1100 may include selectively extending or retracting and selectively rotating a plurality of legs 117 to rest unsecured on the non-planar work surface 900 (block 1112). In this regard, the at least three legs 117 may be positioned on the non-planar work surface 900 while the operator holds the portable drill assist tool 100 in alignment on the non-planar work surface 900. The adjusting includes sliding each leg 117 within a corresponding cavity 114 in the main body 102 to translate toward the non-planar work surface 900 along a corresponding axis. The adjusting includes pivoting each leg 117 relative to the main body 102 to selectively position an end of the leg 117 relative to the non-planar work surface 900 about the corresponding axis illustrated in FIG. 7 702. The non-planar work surface 900 may be flat (e.g., in FIG. 9 910) or contoured (e.g., in FIG. 9 906 or 908). The non-planar work surface 900 may have obstructions 904 in the vicinity of the target hole 902. The leg pads 124 may rest unsecured on the non-planar work surface 900 after the legs 117 are adjusted.

After the at least three legs 117 are selectively extended/retracted and/or rotated and the leg pads 124 rest unsecured on the non-planar work surface 900, the method 1100 may include tightening the at least three leg lock mechanisms 107 while maintaining the through hole 103 in the substantially perpendicular alignment to the non-planar work surface 900 (block 1114). Tightening the lock mechanism 107 includes adjusting the at least three lock mechanisms 107 passing through corresponding insert holes 108 distributed about a perimeter of the main body 102 to exert a lateral force to fix the legs 117 relative to the main body 102 to maintain the through hole 103 in the substantially perpendicular alignment.

Once the legs 117 are positioned, the operator may physically hold the portable drill assist tool 100 while the at least three legs 117 are locked into position. The legs 117 may be fixed in position by engaging the lock mechanism 107 (e.g., lock handle 112 including threaded fastener 132) into the threaded insert 110 within the insert hole 108 to exert a lateral force to fix the legs 117.

A subsequent block 1116 includes removing the alignment pin 104 from the target hole 902 and the drill bushing 106. After the legs 117 are locked in position, the operator may maintain the portable drill assist tool 100 in position on the non-planar work surface 900 while removing the alignment pin 104 from the target hole 902 and the drill bushing 106 in preparation to drill a hole.

After the alignment pin 104 has been removed, the method 1100 may include passing a drill bit through the drill bushing 106 into the target hole 902 while the legs 117 maintain the through hole 103 in the perpendicular alignment to the non-planar work surface 900 (block 1118). The drill bit chosen for block 1118 may be selected from one of several drill bits. In some embodiments, the drill bit diameter may correspond to the first diameter 104a of the alignment pin 104. In this regard, the drill bushing 106 would not be replaced. In other embodiments, a drill bit may be chosen with a diameter different than the first diameter 104a of the alignment pin 104 and a second drill bushing 106 with an inner diameter corresponding to the drill bit may need to replace the first drill bushing 106. In this regard, the method may include inserting a second drill bushing 106 having a second inside diameter into the through hole 103 and passing a drill bit through the second drill bushing 106 into the target hole 902 while the legs 117 maintain the through hole 103 in the perpendicular alignment to the non-planar work surface 900. The operator may maintain the portable drill assist tool 100 in position on the non-planar work surface 900 while passing the drill bit through the drill bushing 106.

After passing a drill bit through the drill bushing 106, the method 1100 may include contacting the drill bit to the target hole 902 using the drill bushing guide hole 105 for guidance and drilling through the target hole 902 and into the non-planar work surface 900 by the drill bit (block 1120). The operator may use a hand drill and contact the drill bit to the target hole 902 while maintaining the portable drill assist tool 100 in the alignment position. The operator may proceed to drill through the target hole 902 and into the non-planar work surface 900 using the drill bushing guide hole 105 to guide the drill bit.

After the hole has been drilled, the operator may proceed to remove the drill bit from the drill bushing 106 (block 1122), remove the drill bushing 106 from the through hole 103 of the portable drill assist tool 100 (block 1124) and remove the portable drill assist tool 100 from the non-planar work surface 900 (block 1126).

Embodiments described above illustrate but do not limit the invention. For example, it will be appreciated that, where appropriate, principles applied herein to drilling a perpendicular hole in a contoured surface of an airframe assembly can be applied to drilling a perpendicular hole in a multitude of contoured surfaces in complex assemblies. It should also be understood that numerous modifications and variations are possible in accordance with the principles of the present invention. Accordingly, the scope of the invention is defined only by the following claims.

What is claimed is:

1. An apparatus comprising:
a main body having a through hole formed therein, the through hole configured to receive a drill bushing and an alignment pin passed through the drill bushing to align the through hole substantially perpendicular to a target hole formed within a non-planar work surface;
at least three legs configured to independently translate relative to each other and relative to the main body along corresponding axes toward the non-planar work surface;
wherein each leg comprises a leg guide, a leg extension, and a pad, wherein the leg extension comprises a first end coupled to the leg guide and a second end coupled to the pad; and
wherein the second end of each leg extension is configured to translate its associated pad in an arc about the corresponding axis of its associated leg to contact the non-planar work surface and maintain the through hole in the substantially perpendicular alignment.

2. The apparatus of claim 1, wherein each leg is configured to slide within a corresponding cavity in the main body to translate toward the non-planar work surface along its corresponding axis.

3. The apparatus of claim 2, further comprising at least three lock mechanisms configured to pass through corresponding insert holes distributed about a perimeter of the main body and exert lateral force to fix the legs relative to the main body to maintain the through hole in the substantially perpendicular alignment.

4. The apparatus of claim 1, wherein the leg guide, the leg extension, and the pad of each leg are configured to rotate together to translate the associated pad.

5. The apparatus of claim 1, wherein the main body comprises at least one blind pocket forming within the main body to reduce a weight of the apparatus.

6. The apparatus of claim 1, wherein the through hole extends from a center of a top surface of the main body to a center of a bottom surface of the main body.

7. The apparatus of claim 1, further comprising the drill bushing.

8. The apparatus of claim 1, further comprising the alignment pin.

9. A method of operating the apparatus of claim 1, the method comprising:
inserting the drill bushing into the through hole;
passing the alignment pin through the drill bushing into the target hole in the non-planar work surface to align the through hole perpendicular to the non-planar work surface; and
adjusting the legs to contact the work surface and maintain the through hole in the perpendicular alignment to the non-planar work surface.

10. The method of claim 9, further comprising:
drilling the non-planar work surface by a drill bit.

11. A method comprising:
providing an apparatus comprising a main body having a through hole formed therein and at least three legs configured to independently translate relative to each other and relative to the main body along corresponding axes toward a non-planar work surface, wherein each leg comprises a leg guide, a leg extension, and a pad, wherein the leg extension comprises a first end coupled to the leg guide and a second end coupled to the pad;
inserting a drill bushing into the through hole;
passing an alignment pin through the drill bushing into a target hole in the non-planar work surface to align the through hole perpendicular to the non-planar work surface; and
adjusting the legs to contact the non-planar work surface and maintain the through hole in the perpendicular alignment to the non-planar work surface, wherein the second end of each leg extension is configured to translate its associated pad in an arc about the corresponding axis of its associated leg.

12. The method of claim 11, wherein the adjusting comprises sliding each leg within a corresponding cavity in the main body to translate toward the non-planar work surface along its corresponding axis.

13. The method of claim 12, wherein the adjusting comprises adjusting at least three lock mechanisms passing through corresponding insert holes distributed about a perimeter of the main body to exert lateral force to fix the legs relative to the main body to maintain the through hole in the substantially perpendicular alignment.

14. The method of claim 11, wherein the leg guide, the leg extension, and the pad of each leg are configured to rotate together to translate the associated pad.

15. The method of claim 11, wherein the main body comprises at least one blind pocket formed within the main body to reduce a weight of the apparatus.

16. The method of claim 11, wherein the through hole extends from a center of a top surface of the main body to a center of a bottom surface of the main body.

17. The method of claim 11, further comprising:
- removing the alignment pin from the target hole and the drill bushing;
- passing a drill bit through the drill bushing into the target hole while the legs maintain the through hole in the perpendicular alignment to the non-planar work surface; and
- drilling the non-planar work surface by the drill bit.

18. The method of claim 11, wherein the drill bushing is a first drill bushing having a first inside diameter, the method further comprising:
- removing the alignment pin and the first drill bushing from the through hole;
- inserting a second drill bushing having a second inside diameter into the through hole;
- passing a drill bit through the second drill bushing into the target hole while the legs maintain the through hole in the perpendicular alignment to the non-planar work surface; and
- drilling the non-planar work surface by the drill bit.

* * * * *